US007735879B2

(12) United States Patent
Toscano et al.

(10) Patent No.: US 7,735,879 B2
(45) Date of Patent: Jun. 15, 2010

(54) SUCKER ROD CONNECTION WITH IMPROVED FATIGUE RESISTANCE, FORMED BY APPLYING DIAMETRICAL INTERFERENCE TO REDUCE AXIAL INTERFERENCE

(75) Inventors: Rita Genoveva Toscano, Buenos Aires (AR); Nicolás Héctor Mario Di Toro, Buenos Aires (AR)

(73) Assignee: Siderca S.A.I.C. (AR)

( * ) Notice: Subject to any disclaimer, the term of this patent is extended or adjusted under 35 U.S.C. 154(b) by 513 days.

(21) Appl. No.: 11/652,280

(22) Filed: Jan. 10, 2007

(65) Prior Publication Data

US 2007/0200345 A1    Aug. 30, 2007

Related U.S. Application Data

(60) Provisional application No. 60/757,572, filed on Jan. 10, 2006, provisional application No. 60/773,523, filed on Feb. 15, 2006.

(51) Int. Cl.
*F16L 25/00* (2006.01)
(52) U.S. Cl. ...................................... 285/333; 285/334
(58) Field of Classification Search ......... 285/333–334, 285/355, 390
See application file for complete search history.

(56) References Cited

U.S. PATENT DOCUMENTS

| 1,671,458 | A | * | 5/1928 | Wilson | 403/343 |
| 2,075,427 | A | * | 3/1937 | Church | 285/36 |
| 2,211,173 | A | * | 8/1940 | Shaffer | 285/148.7 |
| 3,054,628 | A | * | 9/1962 | Hardy et al. | 285/332.3 |
| 3,307,860 | A | * | 3/1967 | Blount et al. | 285/55 |
| 4,406,561 | A | | 9/1983 | Ewing | |
| 4,475,839 | A | | 10/1984 | Strandberg | |
| 4,602,807 | A | | 7/1986 | Bowers | |
| 6,349,979 | B1 | * | 2/2002 | Noel et al. | 285/333 |
| 6,412,831 | B1 | * | 7/2002 | Noel et al. | 285/334 |
| 6,481,760 | B1 | * | 11/2002 | Noel et al. | 285/334 |
| 7,108,063 | B2 | | 9/2006 | Carstensen | |
| 2004/0151608 | A1 | | 8/2004 | Vogt et al. | |

FOREIGN PATENT DOCUMENTS

WO    WO 94/29627    12/1994

* cited by examiner

*Primary Examiner*—Aaron M Dunwoody
*Assistant Examiner*—Fannie Kee
(74) *Attorney, Agent, or Firm*—Knobbe Martens Olson & Bear LLP

(57) ABSTRACT

A sucker rod connection is disclosed. The sucker rod connection comprises a tapered male member including a plurality of trapezoidal threads, and, a tapered female member also including a plurality of trapezoidal threads, in which the male member is capable of being received in threaded engagement with the female member, wherein the threads of the male member are in flank-to-flank contact, both flanks on each thread, with the threads of the female member, thereby creating diametrical interference between the male and female members preventing disengagement and substantially reducing axial interference between the male and female members.

23 Claims, 15 Drawing Sheets

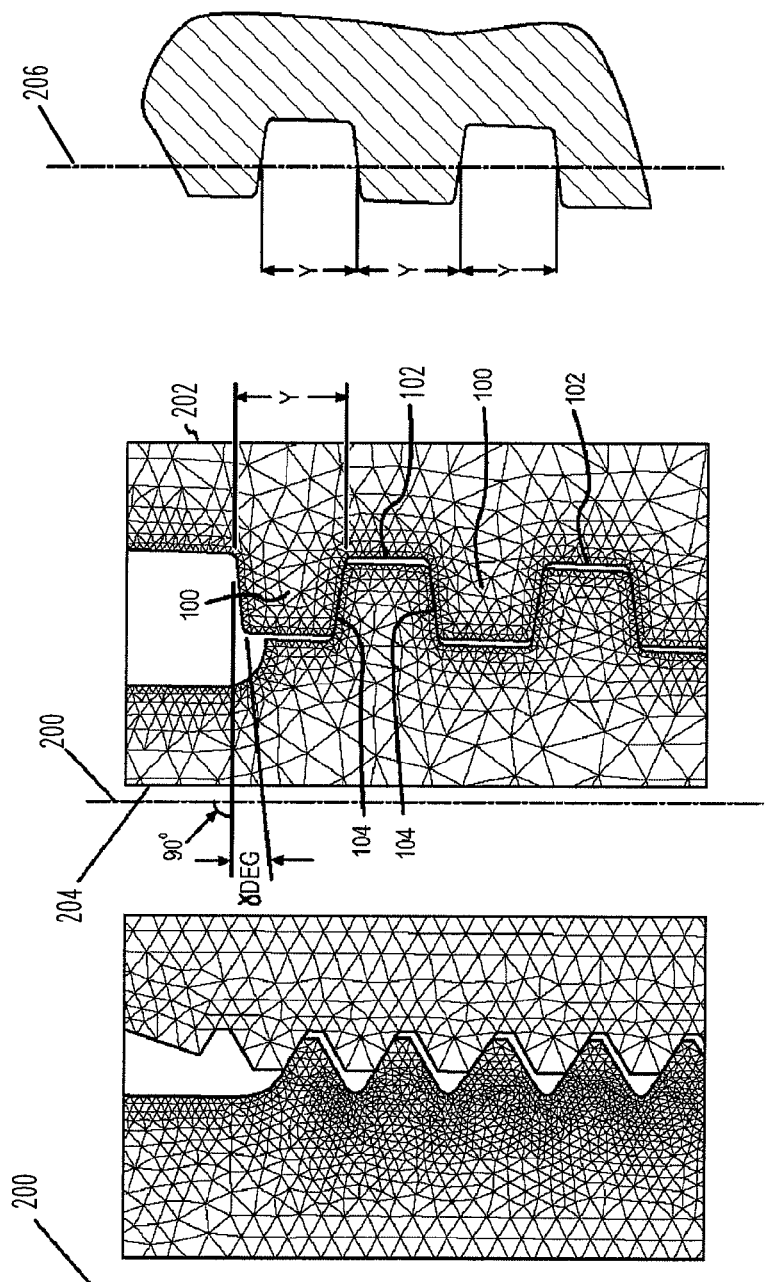

PRINCIPAL STRESS N°:3

PRINCIPAL STRESS N°:2

PRINCIPAL STRESS N°:1

SUCKER ROD CONNECTION WITH IMPROVED FATIGUE RESISTANCE, FORMED BY APPLYING DIAMETRICAL INTERFERENCE TO REDUCE AXIAL INTERFERENCE

CROSS-REFERENCE TO RELATED APPLICATIONS

This application claims priority to U.S. Provisional Application No. 60/757,572, filed Jan. 10, 2006, and U.S. Provisional Application No. 60/773,523, filed Feb. 15, 2006, both of which are hereby incorporated by reference in their entireties.

BACKGROUND OF THE INVENTION

1. Field of the Invention

Embodiments of the present invention relate to a sucker rod connection, and more particularly, a sucker rod connection with improved fatigue resistance and a method for achieving the same.

2. Description of the Related Art

Sucker rods are rods, typically made of steel or other materials, used to make up the mechanical assembly between the surface and downhole components of a rod pumping system. Sucker rods are conventionally about 25 to 30 ft (about 7 to 9 m) long and have threaded pins at ends of an elongate bar to enable the downhole components to be run and retrieved easily. Sucker rods can be connected with a threaded box or other threaded connection engaging the threaded pin. Typical diameters for sucker rods are ⅝", ¾", ⅞", 1" and 1⅛".

The problem of sucker rod failure is particularly severe in 22.22 mm (⅞") diameter, grade D, API-11B rods. Most failures occur in the rod in the area of the last thread engaged of the pin. In the prior art, for example with a 22.22 mm (⅞") diameter, grade D, API-11B rod, the thread of the rod is cylindrical, and the diameter of the pin thread is a little smaller than the diameter of the box thread. As shown in FIG. 1A and FIG. 3, only the load flanks of the pin and box come in contact when making up the connection. In other words, there is no diametrical interference, and therefore to prevent disengagement it is necessary to introduce in the connection high deformation between the shoulder of the box and the shoulder of the pin after they come in contact. This deformation creates high axial tension in the pin and compression in the box. This tension in the pin, because of the make up, is added to the cyclical external tension (fatigue) which appears when the rod is working on pumping oil at the well. As a result, very often the tension goes above the resistance allowed of the steel and breaks the pin body in the area of the last engaged thread.

SUMMARY OF THE INVENTION

To address the problem of rod failure, certain embodiments of this invention are directed to a connection for sucker rods aimed at increasing the resistance to failure caused by fatigue.

One embodiment of the present invention relates to a sucker rod connection, preferably comprising a threaded pin at the end of a bar connected to a threaded box, in which fatigue resistance is increased by applying a diametrical interference which prevents disengagement and that substantially reduces axial interference as used in prior designs. More specifically, embodiments of the present invention are directed to a connection that includes a tapered threaded connection, trapezoidal threads and flank-to-flank, load and stab, thread contact. Further embodiments comprise a shoulder close to the last thread of pin, which surface is perpendicular to the pin axis. The box may have another shoulder close to the beginning of the thread, which surface is perpendicular to the box axis. Both surfaces come in contact when making up the connection to accurately control the diametrical interference.

In one embodiment, a tapered or cone-shaped threaded connection, trapezoidal threads and flank-to-flank thread contact, load and stab, are incorporated. Preferably, the connection comprises about 4 to 10 threads per inch, wherein the flank angle of each thread ranges from about 2° to 10°, preferably about 3°, with respect to the perpendicular line to the connection axis 200, and the threaded connection tapers from about ¹⁄₁₅ to ¹⁄₃₀ of the diameter of the connection.

A shoulder at the end of the make up may also be included, similar but not equal to the previous art. Thus, a significant reduction of axial interference is achieved by means of diametrical interference preventing disengagement. This diametrical interference is achieved because the trapezoidal solid shape of one thread goes into the trapezoidal empty shape of another thread, obtaining a wedge effect. In other words, the crest of the thread is larger than the root of the thread.

As used hereinafter, the fatigue parameter D is calculated as follows:

$$S_{mi} = \frac{S_{i,máx} + S_{i,mín}}{2}$$

$$S_{ai} = \frac{S_{i,máx} + S_{i,mín}}{2}$$

$$\overline{\sigma_m} = \frac{S_{m1} + S_{m2} + S_{m3}}{3}$$

$$\sigma_a = \frac{[(S_{a1} - S_{a2})^2 + (S_{a2} - S_{a3})^2 + (S_{a3} - S_{a1})^2]^{1/2}}{\sqrt{2}}$$

$$D = \frac{\frac{T}{3} - \overline{\sigma_m}}{\sigma_a}$$

Where:
$S_{ai}$: alternating components of principal stress
$S_{mi}$: mean components of principal stress
T: Minimum Tensile Strength The alternating and mean components are calculated on the basis of maximum and minimum values of a load cycle.

Preferably, the coefficient D is higher than or equal to 1 (one) to ensure infinite fatigue life.

In prior studies, following the API-11BR Standard (API Recommended Practice 11BR, "Recommended Practice for Care and Handling of Sucker Rods", October 1989, the entirety of which is incorporated herein by reference), after the shoulders come into contact, circumferential displacement of the pin shoulder outer diameter (OD) is 7.14 mm (⁹⁄₃₂"); such displacement value implies a 0.14 mm (0.0055") axial interference. For an OD of the pin shoulder, of 41.3 mm (1.626"), the perimeter is 129.75 mm (5.108") in circumference; the thread lead is 2.54 mm (0.100") axial and therefore a 7.14 mm (0.281") circumferential displacement generates 0.14 mm (0.0055") of axial interference.

Therefore, one purpose of certain embodiments described herein is to provide a sucker rod connection with diametrical interference that minimizes axial interference.

A further purpose of certain embodiments described herein is to provide said connection by means of a tapered threaded connection, with trapezoidal threads and flank-to-flank, load and stab, contact among them.

Still another purpose of certain embodiments described herein is to decrease axial interference by means of a diametrical interference.

Still a further purpose of certain embodiments described herein is to improve fatigue-related behavior of the connection by means of a flank-to-flank, load and stab, contact among the threads.

An additional further purpose of certain embodiments described herein is to provide a low thread deformation, and a thread width and angle designed accordingly.

Yet another further purpose of certain embodiments described herein is that the tensile stresses and deformations that occur upon loading of the connection be reduced, and minimizing plastic deformations so that the distribution of those stresses and deformations are more homogeneous than in a cylindrical thread connection. Such concept allows assembly, use, disassembly and use several times without losing the main features of the connection.

BRIEF DESCRIPTION OF THE DRAWINGS

FIG. 1A shows a conventional, cylindrical connection between a sucker rod and a threaded box.

FIG. 1B shows a tapered connection according to one embodiment of the invention, using trapezoidal threads.

FIG. 1C shows the location of the pitch line 206 with respect to the trapezoidal threads of FIG. 1B, such that the empty side and the solid side of the thread are equal.

FIGS. 2A and 2B show modified Goodman diagrams for grade D sucker rods, both used to determine the fatigue limits for stress, minimal stress and maximum stress allowed. The three load cycles were from: −1.8 to 7.2 kg/mm$^2$ (−2.56 to 10.2 ksi), 1.8 to 20.7 kg/mm$^2$ (2.56 to 29.4 ksi) and 13.5 to 27 kg/mm$^2$ (19.2 ksi to 38.4 ksi). The "third load cycle," as used herein, refers to one of three load cycles that the connection was subjected to.

DETAILED DESCRIPTION OF THE PREFERRED EMBODIMENTS

Embodiments of the present invention are described below with respect to sucker rods, and more particularly connections used for connecting such sucker rods.

Figure 1:
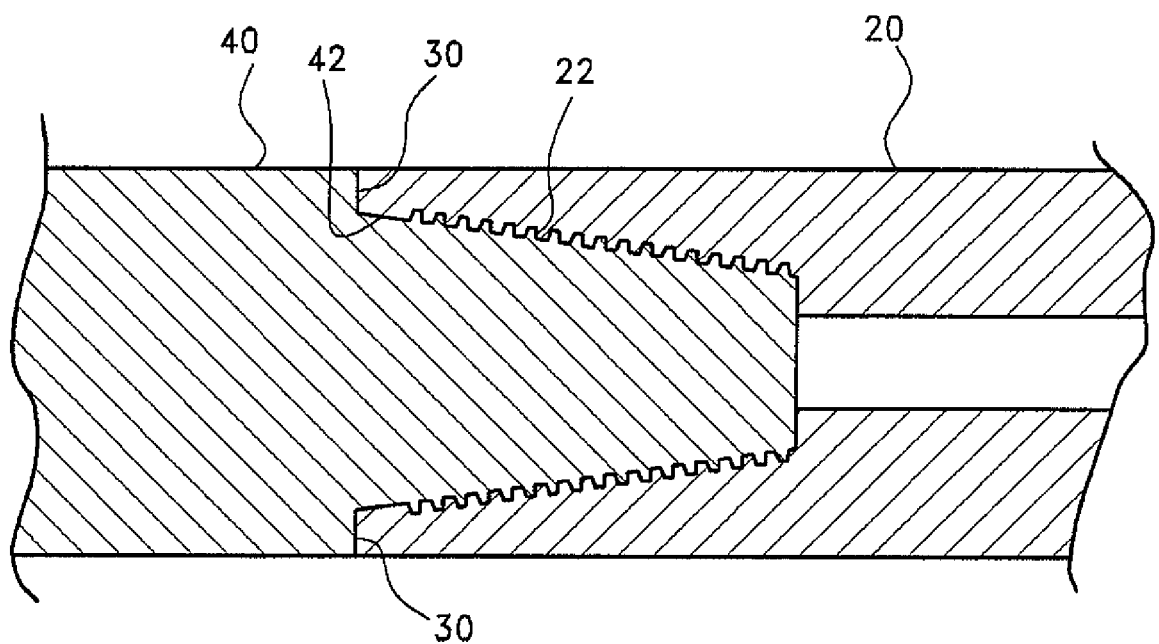
FIG. 1 shows a tapered connection according to one embodiment of the present invention.
Figure 2B:
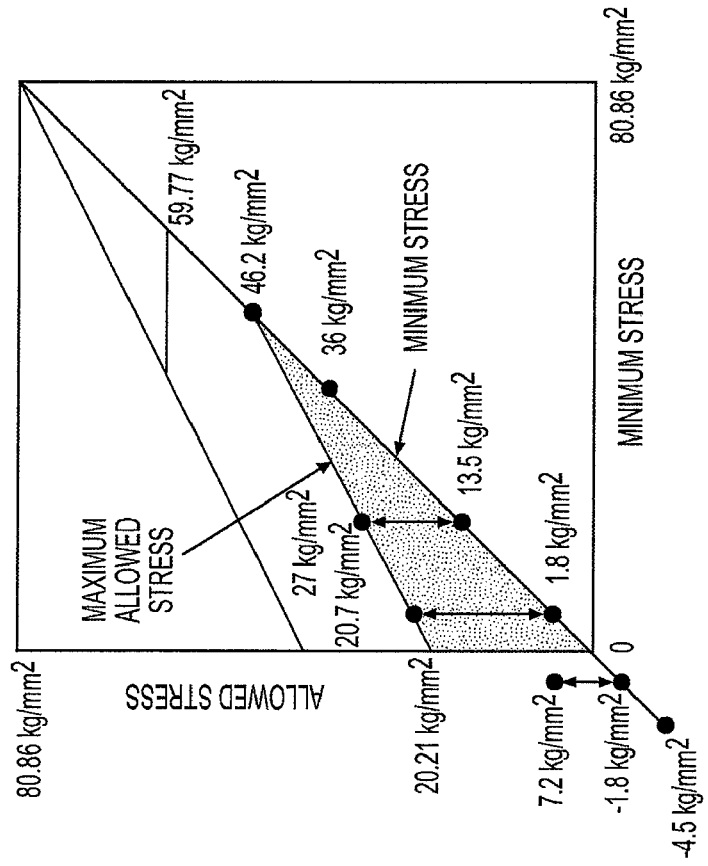
Figure 2A:
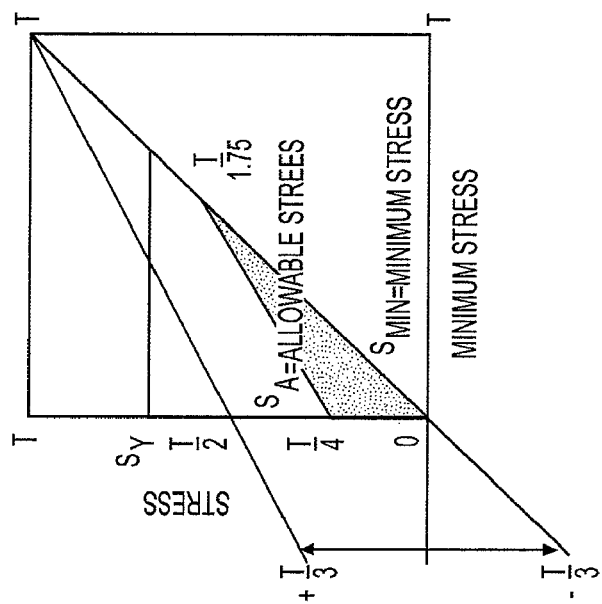

As shown in FIG. 1, the threaded connection between a sucker rod and a threaded box according to one embodiment of the present invention includes a threaded female end 20, or box, and a threaded male end 40, or pin, each of which has corresponding, generally tapered inner surfaces 22, 42. Preferably, the tapered inner surfaces 22, 42 taper from about $\frac{1}{15}$ to $\frac{1}{30}$ of the diameter of the pin and box. These tapered inner surfaces 22, 42 include threads. As shown in FIG. 1B, the threads 100 have inner diameters, where an individual thread meets the outer surface of the pin 204 or box 202, and outer diameters, where an individual thread reaches its peak. In this way, each thread has a groove 102 next to it.

The female end 20 and the male end 40 abut at a shoulder 30 when fully connected, as shown in FIG. 1.

The proposed connection, being a tapered threaded connection with diametrical interference, does not need axial interference values as high as previously known threaded joints. Two axial interference values were analyzed (0.10 mm and 0.05 mm) and the lower value was adopted based on the result obtained according to a finite elements model used for the connection.

The grade D material properties are those established in API 11B. The contemplated material is an elastic plastic, multilinear hardening material with associated plasticity according to von Mises yield criteria and isotropic hardening. Steel is an example of a material which has linear deformation within its elastic limit. Plastic deformation occurs above the elastic limit, with permanent deformation resulting.

The following table shows a summary of five cases analyzed. Starting from a basic design that includes a tapered threaded connection, trapezoidal threads and flank-to-flank, load and stab, contact (e.g., the sides 104 of the threads 100 shown in FIG. 1B contact), the effect of different alternative variables, such as axial interference at the shoulder, diametrical interference, thread width and flank angle were analyzed.

In each of the five analyzed cases, diametrical interference is measured by measuring the pitch diameter of the pin and the pitch diameter of the box and subtracting the two diameters. In this way, a positive value for the diametrical interference means that the pitch diameter of the threads on the pin is larger than the pitch diameter of the threads on the box.

However, the grooves of the thread may also interfere. In other words, the outer diameter of the threads of the pin may be larger than the inner diameter of the threads of the box.

Thread width in each of the five cases is measured at the pitch line 206 of each thread 100 as shown in FIG. 1C by reference letter Y. The flank angle γ (gamma) is measured between the flank line and the perpendicular line to the connection axes, as shown in FIG. 1B.

The following table shows the various conditions.

|        | Threads per axis inch (Threads per 25.4 mm) | Flank Angles (load and stab) | Axial Interference | Diametrical Interference |
|--------|---------------------------------------------|------------------------------|--------------------|--------------------------|
| Case 1 | 8                                           | 7°                           | 0.10 mm            | 0.20 mm                  |
| Case 2 | 8                                           | 7°                           | 0.05 mm            | 0.20 mm                  |
| Case 3 | 8                                           | 7°                           | 0.05 mm            | 0.05 mm                  |
| Case 4 | 6                                           | 3°                           | 0.05 mm            | 0.20 mm                  |
| Case 5 | 6                                           | 3°                           | 0.05 mm            | 0.10 mm                  |

Yield stress: 59.77 kg/mm$^2$=85 KSI (grade D yield stress, or the start of plastic deformation)

Analysis of the Results of Five Cases

Figure 6:
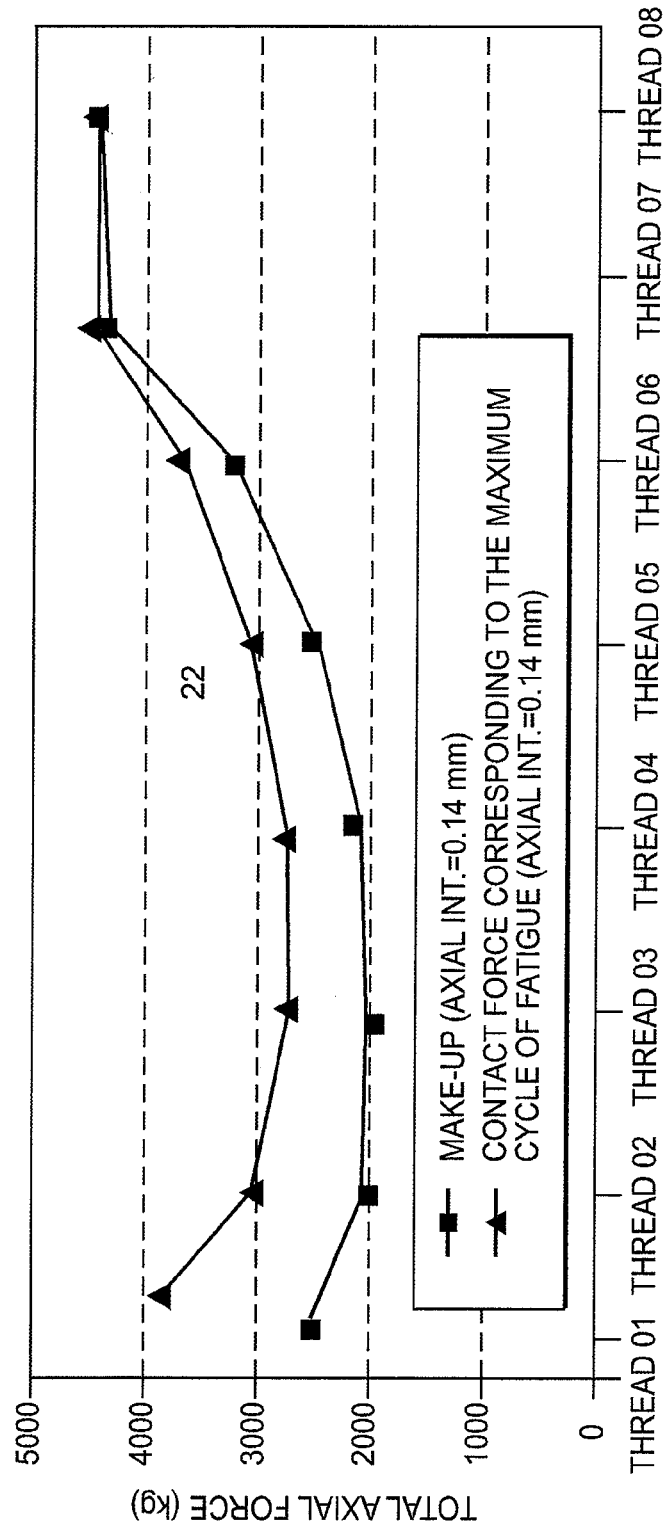
FIG. 6 shows the contact forces on the threads for a cylindrical connection during make-up and during tension corresponding to the maximum fatigue cycle.

It should be noted that in the diagrams of FIG. 6 showing the forces applied on the pin threads, thread No. 1 is the one farthest from the shoulder.

Case 1

This design is less desirable in two aspects: structural (plasticized threads) and fatigue (coefficient of predominantly negative values). Coefficient D shows poorer behavior in the areas where the maximum principal stress is higher, and such stress is the consequence of axial interference. Thread plasticizing is the result of diametrical interference and 7° flank angle.

Case 2

Our hypothesis that a decrease in axial interference improves stress distribution and, therefore, fatigue coefficient D, is confirmed. However, there is still the problem of threads plasticizing, or thread strain.

Case 3

Although the results obtained in this case—both structural and fatigue-related—are good, the diametrical interference is considered too low because it is near the manufacturer's tolerance level, which is about 0.05 mm per part. Thus, a diametrical interference of 0.05 mm means, in practice, that the diametrical interference may be as great as 0.10 mm or as little as 0.00 mm.

Case 4

The results obtained—both structural and fatigue-related—are good. Bearing in mind the connection manufacturer's tolerance, analysis is repeated with a 0.20 mm diametrical interference, this figure being considered as the nominal diametrical interference value.

Case 5

In this case a lower diametrical interference value was analyzed. The results obtained are good for both diametrical interference values. The defined range is compatible with the manufacturer's tolerances.

Figure 3:
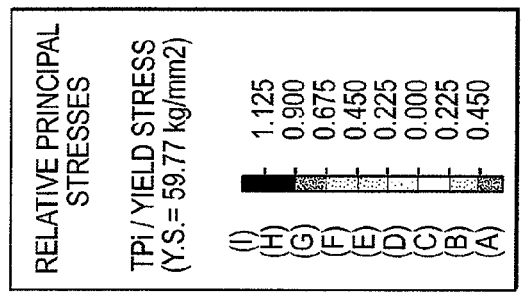
FIG. 3 shows each of the principal tensile stresses during make-up, relative to the yield stress of a conventional connection.
Figure 3:
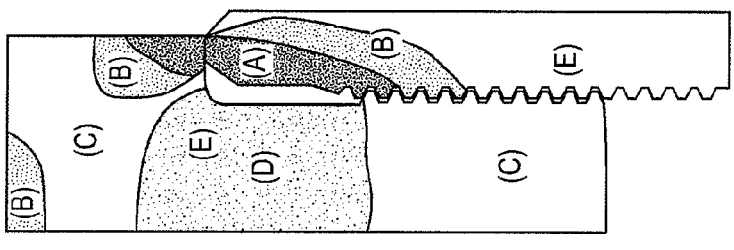
Figure 3:
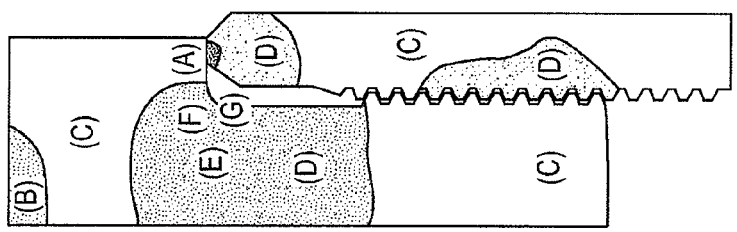
Figure 3:
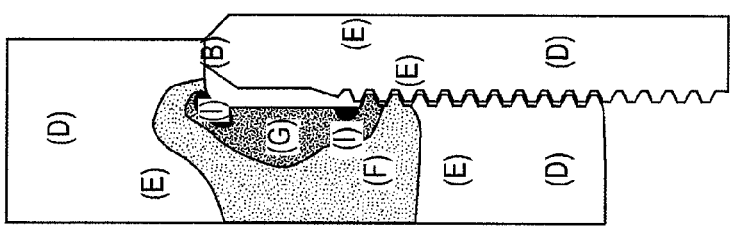
Figure 7:
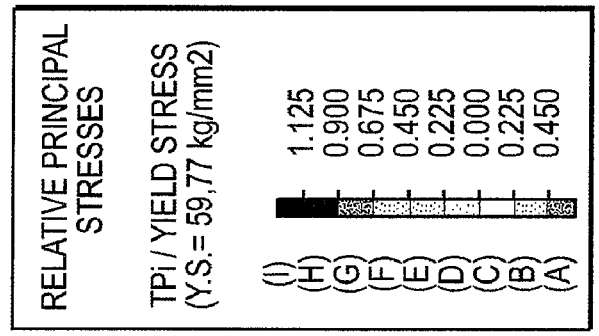
FIG. 7 shows the three orthogonal principal tensile stresses during make-up relative to yield stress in a connection according one embodiment of the present invention with a 0.20 mm diametrical interference; where principal stress for the value i, equal to 1, 2 or 3. Relative principal stress N° i=Principal stress i/Yield stress. (see also FIG. 11).
Figure 7:
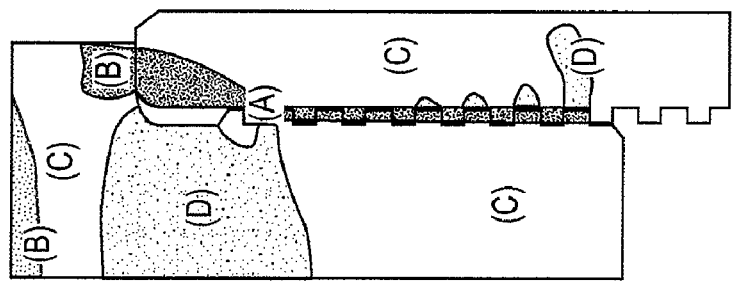
Figure 7:
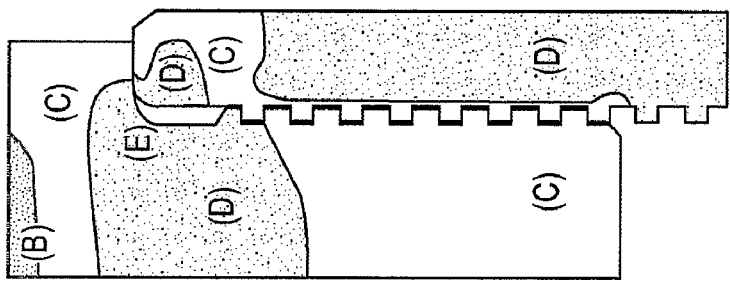
Figure 7:
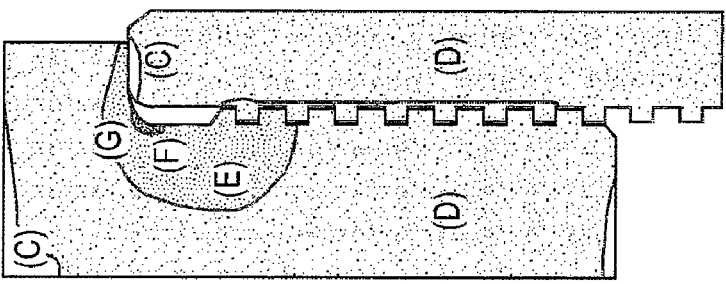
Figure 8B:
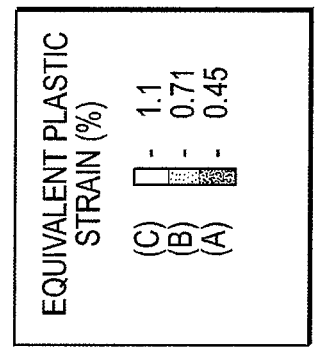
FIGS. 8A and 8B show the plastic strain in a connection according to one embodiment of the present invention with a 0.20 mm diametrical interference, in the make-up process and at maximum load, showing plastic strain (A).
Figure 8B:
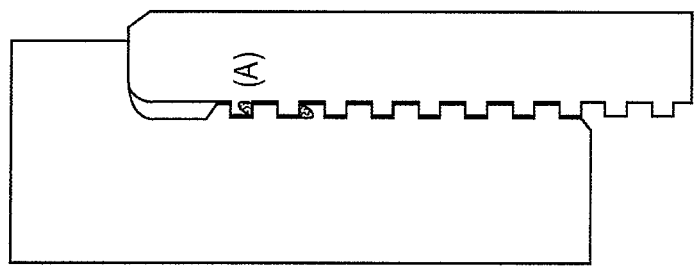
Figure 8A:
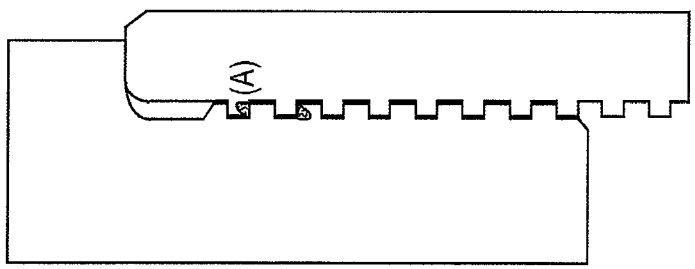
Figure 11:
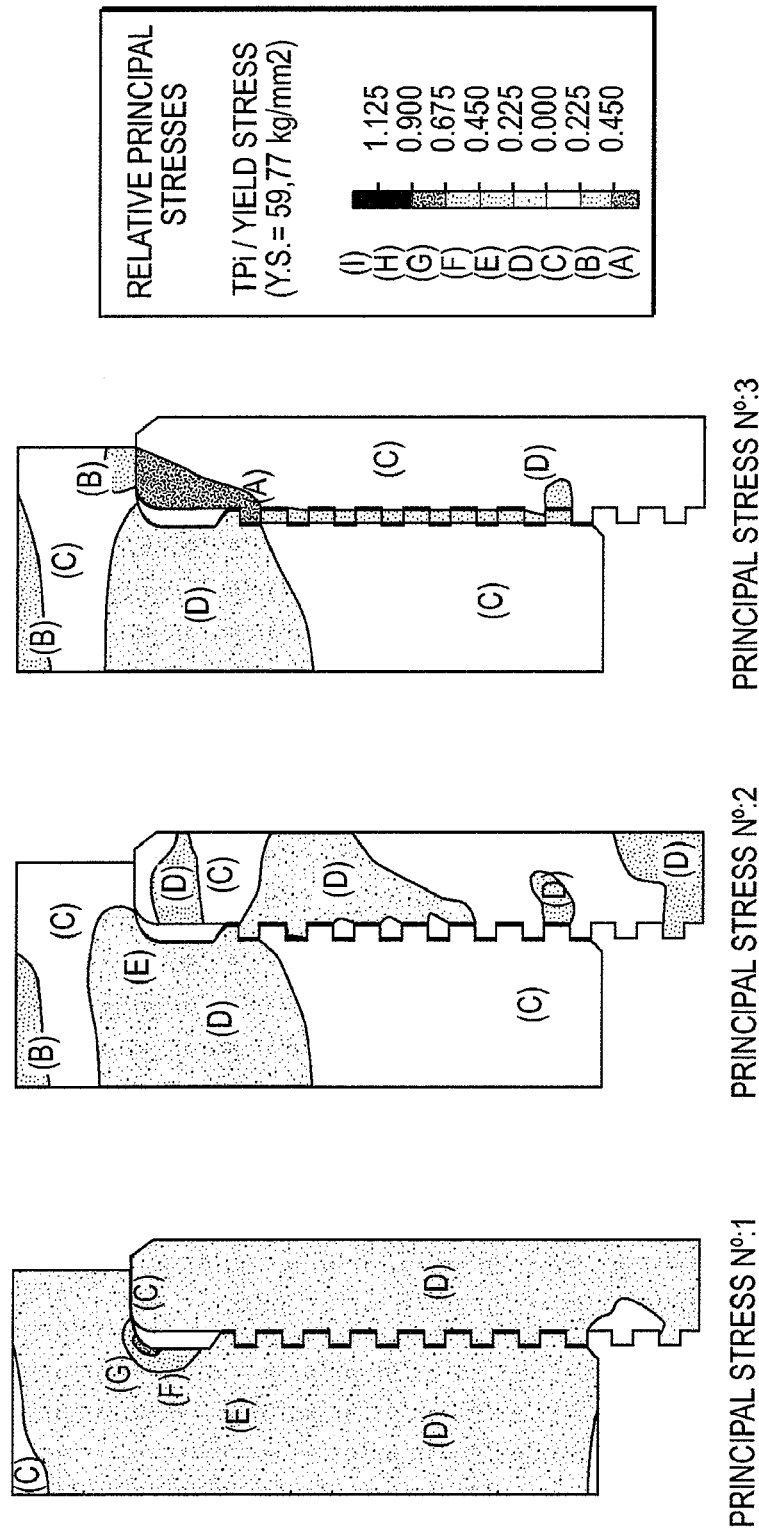
FIG. 11 shows the three principal stresses during make-up relative to the yield stress in a connection according to one embodiment of the present invention with a 0.10 mm diametrical interference.
Figure 12A:
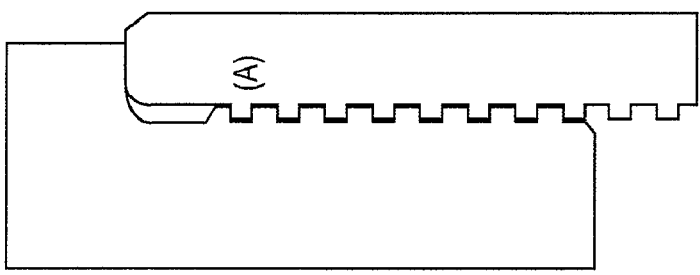
FIGS. 12A and 12B show the plastic strain in a connection according to one embodiment of the present invention, with a 0.10 mm diametrical interference and at maximum load with plastic strain (A) shown.
Figure 12B:
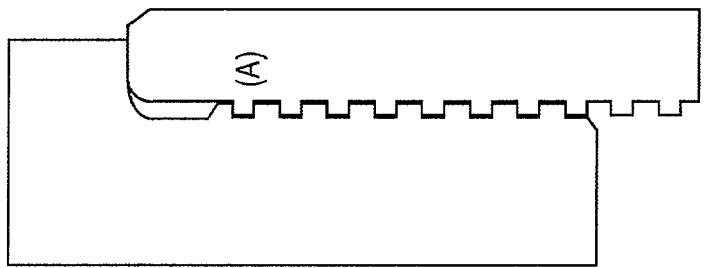
Figure 12B:
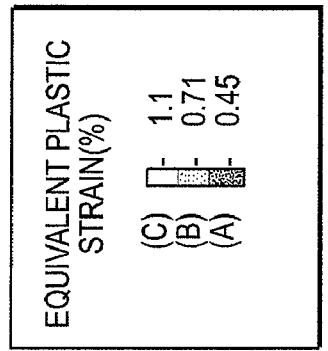

FIGS. 1 (A and B) and 2 (A and B) have already been described above. FIGS. 3 to 14 show the comparative results of both designs, clearly evidencing the advantages of a tapered connection versus a cylindrical connection. As used in the description of FIGS. 3 to 14, the "armed" or "make up" torque is the torque required to achieve the specified amount of axial interference and is applied after the shoulders 30, shown in FIG. 1, come in contact. The figures illustrate the principal stresses during tightening, the equivalent plastic strain and the resulting forces on the pin threads and the fatigue coefficient D calculated in certain areas regarded as critical. Bearing in mind the connection manufacturer's tolerance values, the tests were carried out taking into account two diametrical interferences, a higher one (0.20 mm) referred to as Case A, and a lower one (0.10 mm), referred to as case B, both yielding similar results. FIGS. 3, 7 and 11, show the reduction of the principal stress values, with the disappearance of the high stress areas (reference I in the drawing) located between the shoulder and the last thread engaged with the pin. This improves the fatigue performance of the connection due to a reduced axial interference.

Figures 4A, 4B:
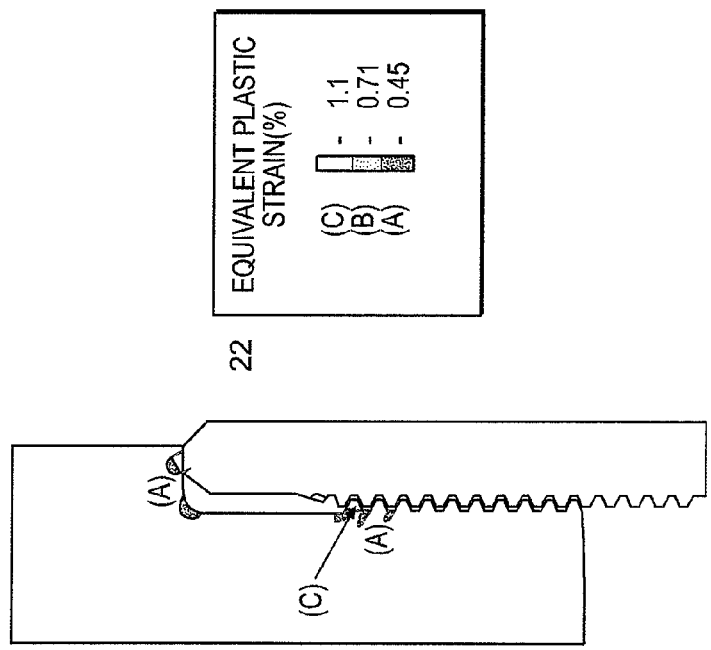
FIG. 4A shows the plastic strains at make-up.
FIG. 4B shows the plastic strains at maximum load during the third load cycle for a conventional cylindrical connection. For both cases plastic strains are between (A) and (C).

Regarding plastic strain, FIGS. 8A and 8B and 12A and 12B show that plasticizing is insignificant in the tapered connection. For 0.20 mm diametrical interference in FIGS. 8A and 8B, there is plastic strain only, and for 0.10 mm diametrical interference in FIGS. 12A and 12B, plasticizing is almost absent. In FIG. 4, the plasticizing seen in the cylindrical connection design is much more significant, affecting the area of the last thread engaged with the pin, where most failures take place.

Figure 5:
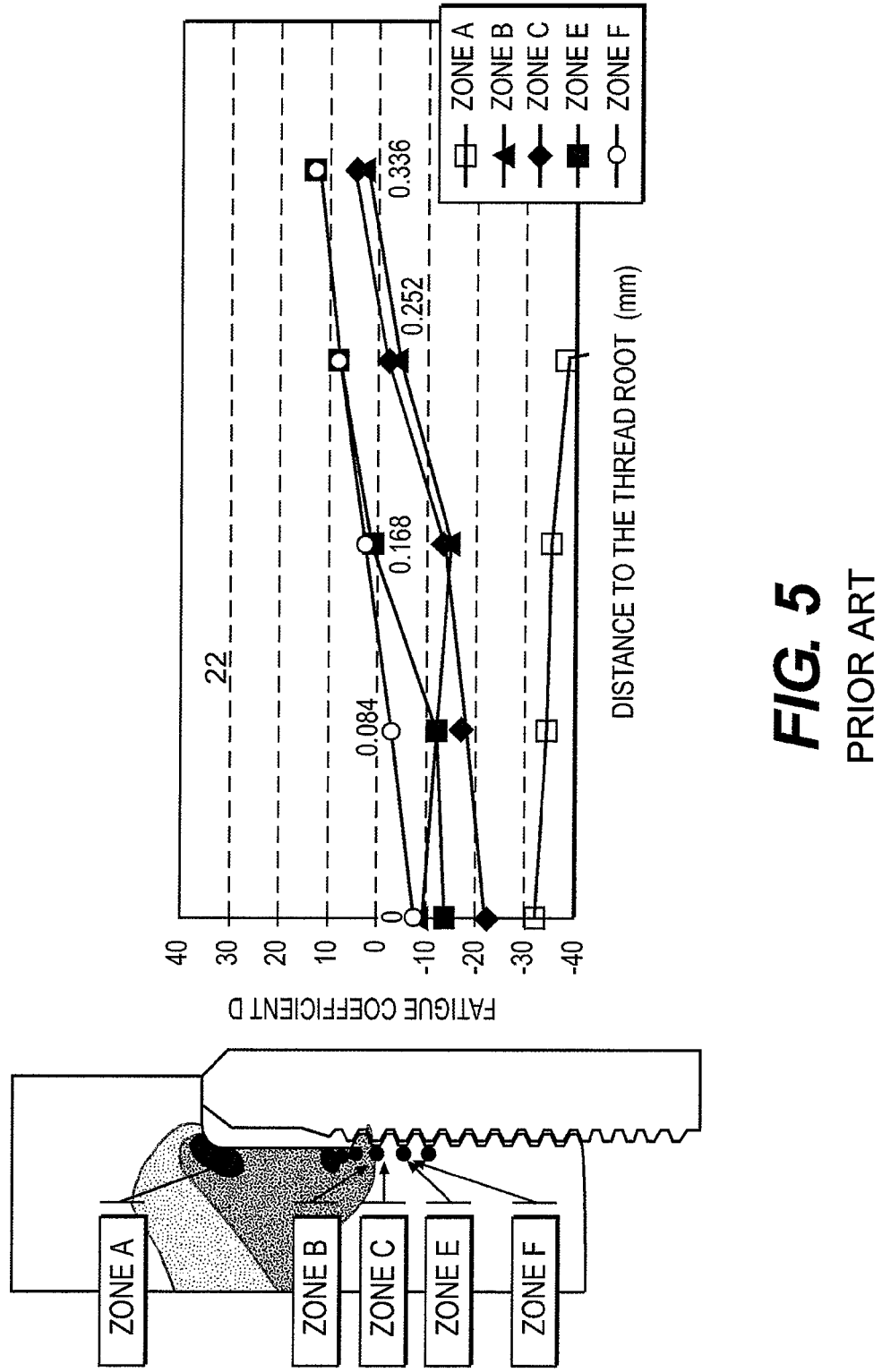
FIG. 5 shows a diagram of the fatigue coefficient D for a conventional rod connection, in five different areas.
Figure 9:
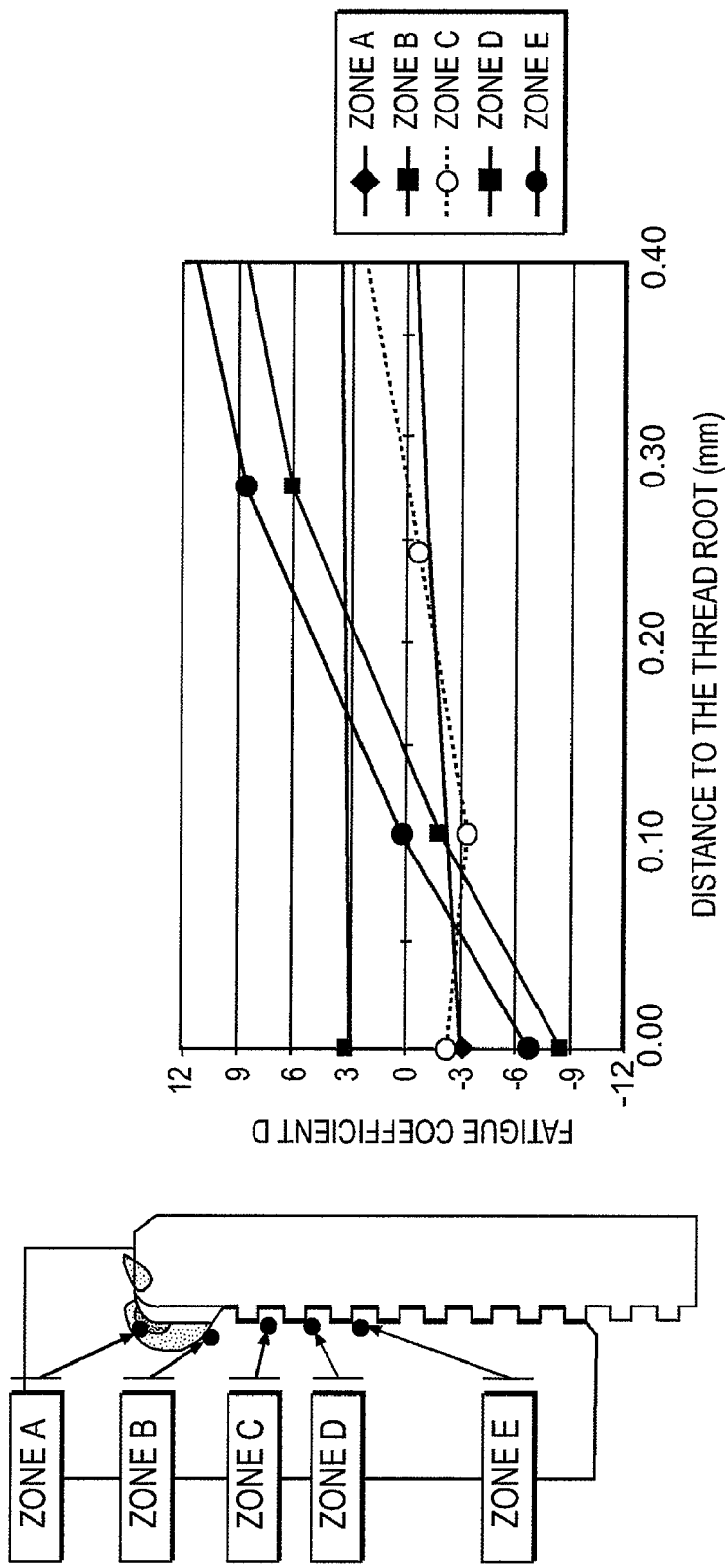
FIG. 9 shows a diagram of fatigue coefficient D for a connection according to one embodiment of the present invention, in five different areas with a 0.20 mm diametrical interference, with Zone C illustrated.
Figure 10:
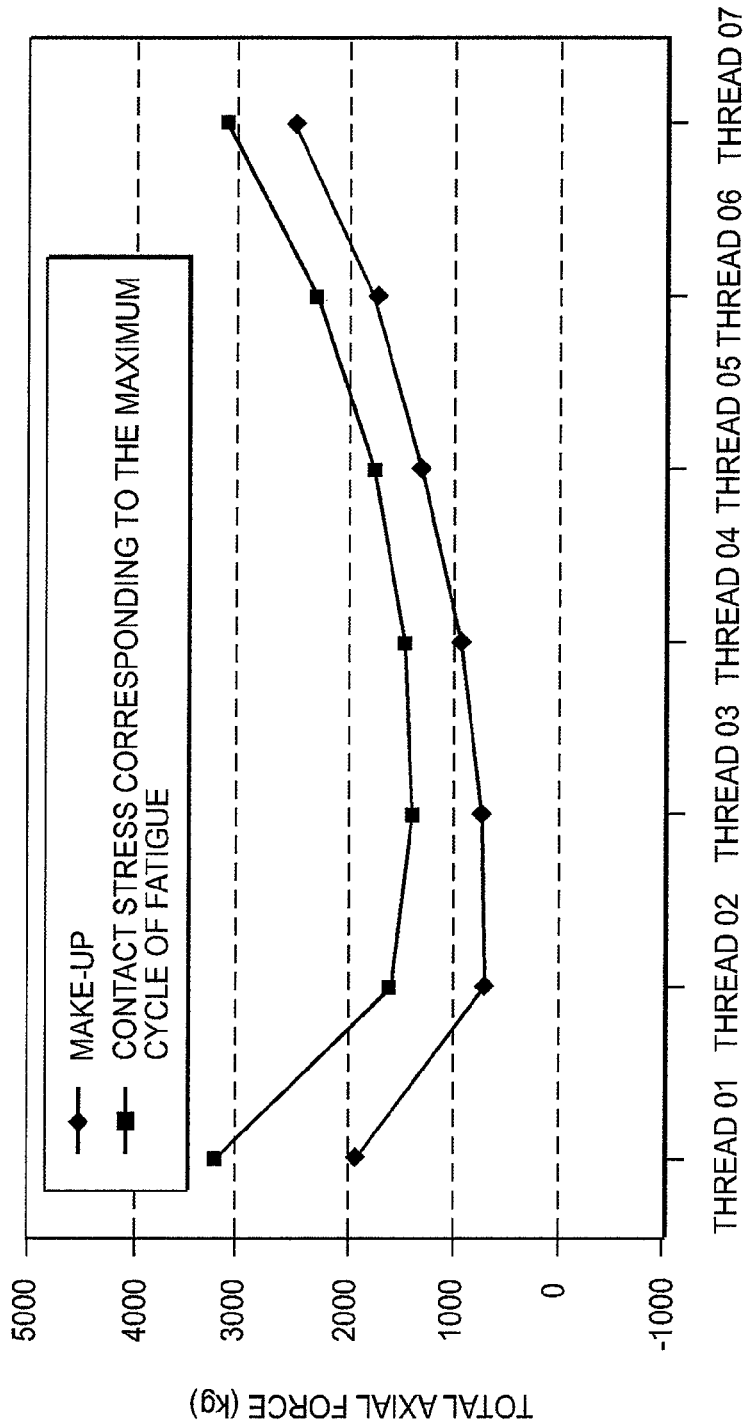
FIG. 10 shows a diagram of contact forces on the threads of a connection according to one embodiment of the invention with a 0.20 mm diametrical interference, in the make-up process and in make-up added to maximum load, with the top line representing the axial force limit (5000 Kg).
Figure 13:
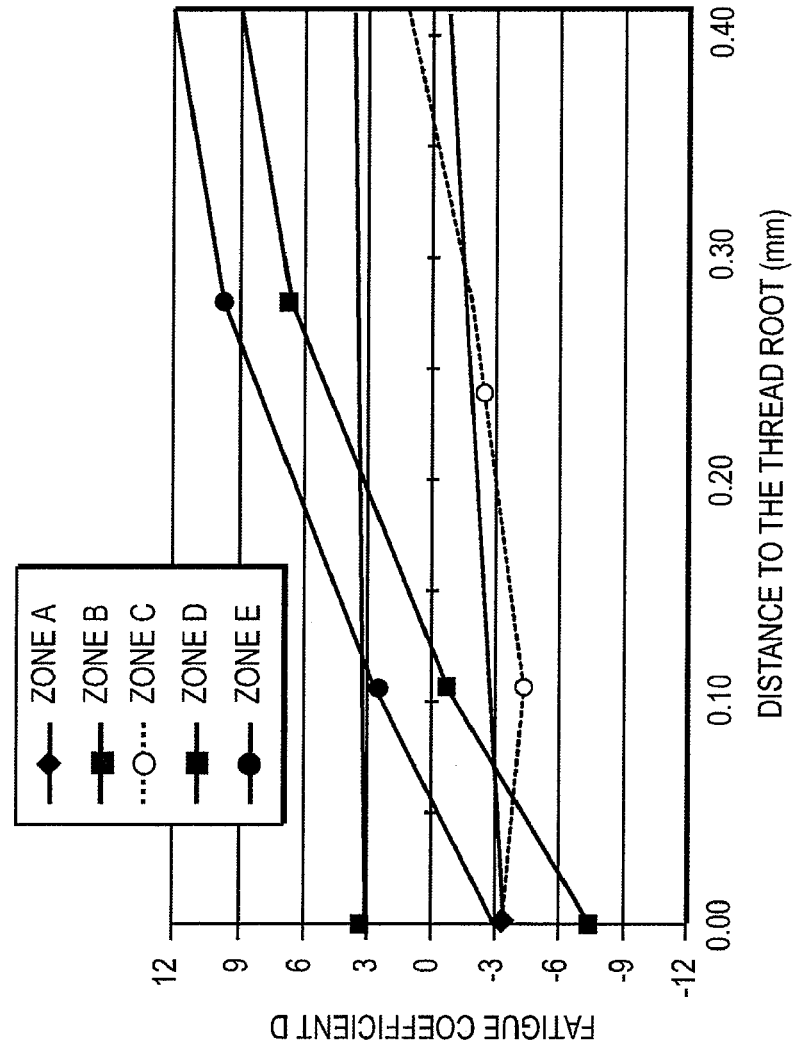
FIG. 13 shows a diagram of fatigue coefficient D for a connection according to one embodiment of the present invention, in five different areas with a 0.10 mm diametrical interference with plastic strain (C) shown.
Figure 13:
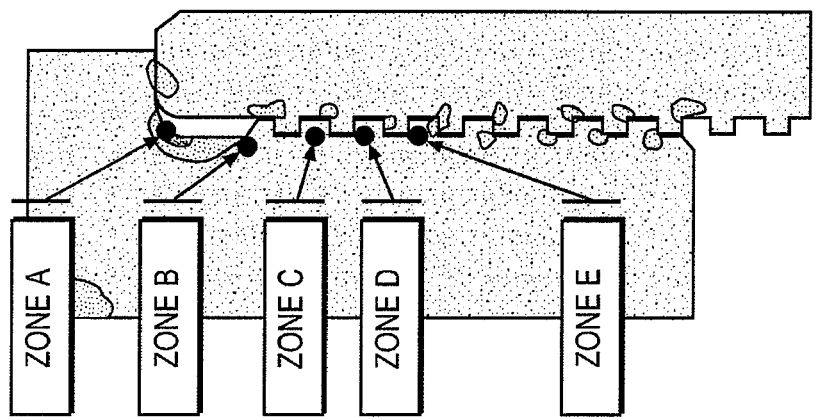
Figure 14:
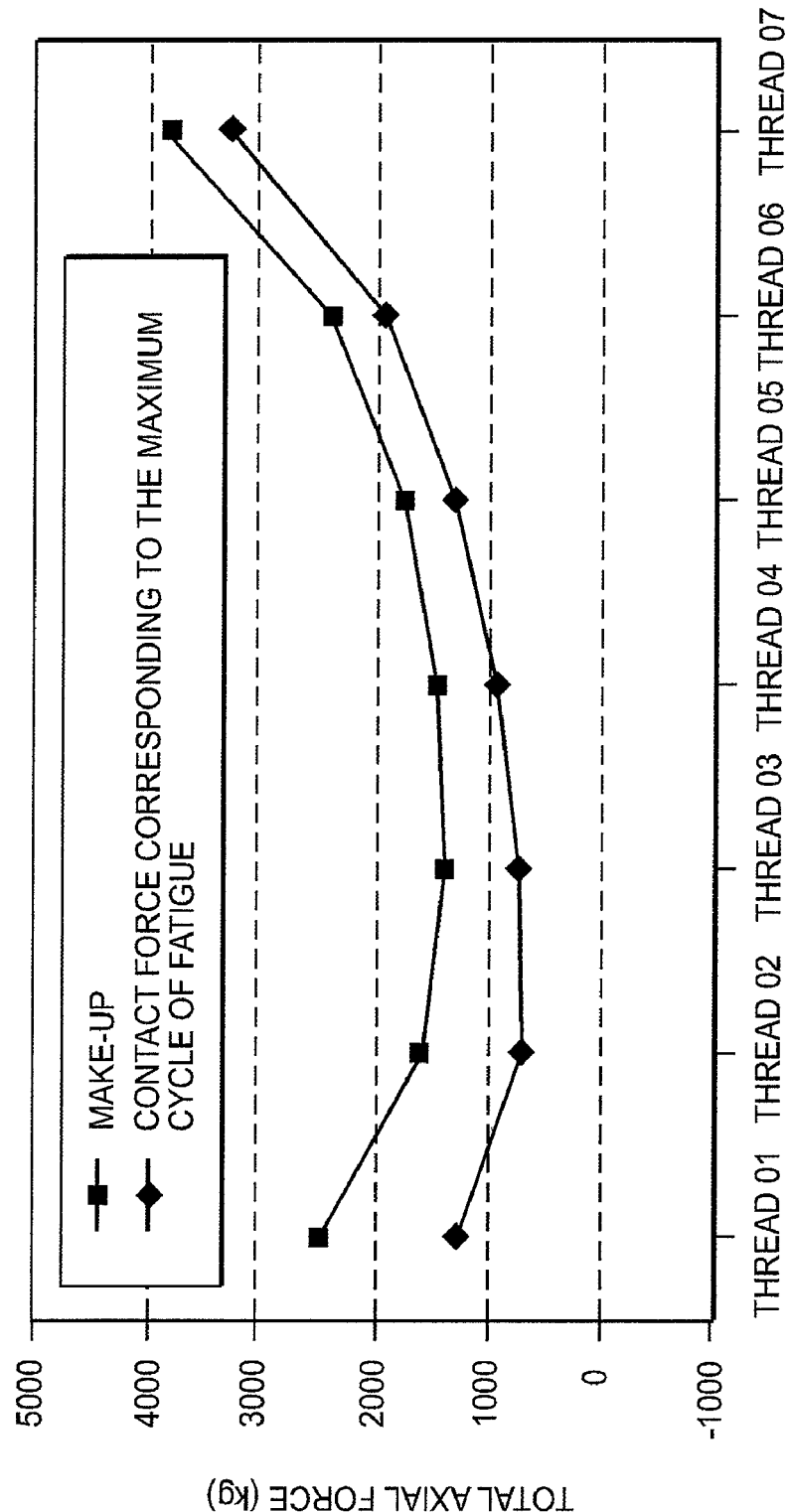
FIG. 14 shows a diagram of the contact forces on the thread of a connection according to one embodiment of the present invention with a 0.10 mm diametrical interference in make-up and in make-up plus the maximum load, with the top line representing the axial force limit (5000 Kg).

Fatigue coefficient D, which must be higher than one (1) in order to ensure the infinite fatigue life of the connection, shows a better performance with the tapered connection (see FIGS. 5, 9, and 13).

Lastly, it can be appreciated that the resulting forces on the pin threads with a tapered connection (FIGS. 10 and 14) are lower than those of the cylindrical connection (FIG. 6) due to a lower axial interference.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

We claim:

1. A sucker rod connection comprising:
   a tapered male member at the end of a bar of a sucker rod including a plurality of external trapezoidal threads having a crest and an external thread pitch diameter; and
   a tapered female member including a plurality of internal trapezoidal threads having a root and an internal thread pitch diameter, in which the male member is capable of being received in threaded engagement with the female member;
   wherein the threads of the male member are in flank-to-flank contact, both flanks on each thread, with the threads of the female member, with the crest of the external threads being larger than the root of the internal threads creating diametrical interference between the male and female members, preventing disengagement, and substantially reducing axial interference between the male and female members;
   wherein the diametrical interference provides a positive value difference by subtracting the pitch diameter of the internal threads of the female member from the pitch diameter of the external threads of the male member.

2. The connection of claim 1, wherein the male member has a shoulder with its surface perpendicular to a longitudinal axis of the male member, the shoulder being located at the end of the threads close to an enlarged portion of the threads.

3. The connection of claim 2, wherein the female member has a shoulder at a front face thereof perpendicular to a longitudinal axis of the female member.

4. The connection of claim 3, wherein both shoulders come in contact when making up the connection and provide accurate diametrical interference between the thread of the male member and the thread of the female member.

5. The connection of claim 1, wherein each of the male member and the female member includes approximately four to ten threads per inch.

6. The connection of claim 1, wherein each of the male member and the female member includes approximately six threads to ten threads per inch.

7. The connection of claim 1, wherein the threads of the male and female members both have flank angles, load and stab, of approximately two to ten degrees relative to a line that is perpendicular to a connection axis along lengths of the male and female members.

8. The connection of claim 1, wherein the threads of the male and female members have flank angles, load and stab, of about three degrees relative to a line that is perpendicular to a connection axis along lengths of the male and female members.

9. The connection of claim 1, wherein the tapering of the male and female members ranges from about 1/15 to 1/30 relative to the respective diameters of the male and female members.

10. The connection of claim 1, wherein the sucker rod has a length from about 25 feet to 30 feet.

11. The connection of claim 1, wherein the diametrical interference is between 0.05 mm and 0.20 mm.

12. A sucker rod connection, comprising:
a pin having a tapered, threaded end portion at the end of a bar of a sucker rod; and
a box with a tapered, threaded opening in which the end portion of the pin is secured by diametrical interference, wherein the threads of the pin and the box are trapezoidal, the threads of the pin and the box have pitch diameters directly adjacent to each other, and the diametrical interference provides a positive value difference when subtracting the pitch diameter of the threads of the box from the pitch diameter of the threads of the pin, and the threads of the pin are in flank-to-flank, load and stab contact, providing a wedge effect with the threads of the box.

13. The connection of claim 12, wherein each of the pin and the box includes approximately four to ten threads per inch.

14. The connection of claim 12, wherein each of the pin and the box includes approximately six threads per inch.

15. The connection of claim 12, wherein the threads of the pin and the box both have flank angles of approximately two to ten degrees relative to a line that is perpendicular to a connection axis along lengths of the pin and the box.

16. The connection of claim 12, wherein the threads of the pin and the box have stab flank and load flank angles of about three degrees relative to a line that is perpendicular to a pin axis and a box axis respectively.

17. The connection of claim 12, wherein the tapering of the end portion of the pin and the opening in the box ranges from about 1/15 to 1/30 relative to the diameters of the end portion and the opening.

18. The connection of claim 12, wherein the diametrical interference is between 0.05 mm and 0.20 mm.

19. A sucker rod connection featuring improved fatigue resistance and reduced axial interference, comprising:
a pin having a tapered end portion at the end of a bar of a sucker rod, the pin including a plurality of trapezoidal external threads having a crest and an external thread pitch diameter; and
a box including a tapered, threaded opening including a plurality of trapezoidal internal threads having a root and an internal thread pitch diameter, in which the end portion of the pin is secured by diametrical interference to the threaded opening of the box, wherein the diametrical interference provides a positive value difference when subtracting the pitch diameter of the internal threads of the box from the pitch diameter of the external threads of the pin;
wherein (i) the threads of the pin are in flank-to-flank contact, load and stab, with the threads of the box, (ii) each of the pin and the box includes about four to ten threads per inch, (iii) the threads of the pin and the box have flank angles, load and stab, of about two to ten degrees relative to a line that is perpendicular to a pin axis and a box axis respectively, (iv) the tapering of the pin and the opening in the box ranges from about 1/15 to about 1/30 relative to the diameters of the end portion and the opening, and (v) a surface shoulder is provided on the pin perpendicular to the pin axis close to the last thread and another surface shoulder is provided at a front face of the box perpendicular to the box axis.

20. The connection of claim 19, wherein each of the pin and the box includes six threads per inch.

21. The connection of claim 19, wherein the threads of the pin and the box have flank angles, load and stab, of about three degrees relative to a line that is perpendicular to a connection axis along lengths of the pin and the box.

22. The connection of claim 19, wherein the diametrical interference is between 0.05 mm and 0.20 mm.

23. The connection of claim 22, wherein the axial interference between the surface shoulder of the pin and the surface shoulder of the box is between 0.05 mm and 0.10 mm.

* * * * *